United States Patent [19]

Kroll et al.

[11] Patent Number: 5,232,064

[45] Date of Patent: Aug. 3, 1993

[54] WEIGHING SCALE ASSEMBLY

[75] Inventors: William P. Kroll, Medina; Robert E. K. Kroll, Plymouth; Kai K. K. Kroll, Minnetonka, all of Minn.

[73] Assignee: Intercomp Company, Minneapolis, Minn.

[21] Appl. No.: 800,626

[22] Filed: Nov. 27, 1991

[51] Int. Cl.5 ............... G01G 3/14; G01L 1/22
[52] U.S. Cl. ..................... 177/211; 73/862.627
[58] Field of Search ............. 177/211; 73/862.627

[56] References Cited

U.S. PATENT DOCUMENTS

| 4,580,645 | 4/1986 | Shoberg | 177/211 |
| 4,666,003 | 5/1987 | Reichow | 177/211 X |
| 4,714,121 | 12/1987 | Kroll et al. | 177/134 |
| 4,979,581 | 12/1990 | Kroll | 177/211 |

Primary Examiner—George H. Miler, Jr.
Attorney, Agent, or Firm—Joel D. Skinner; Anthony G. Eggink

[57] ABSTRACT

A portable weighing scale assembly which is comprised of a base structure including a double ended shear beam load cell structure. The shear beam load cell structure has top and bottom brace members and a spacer plate located at its center position and to which the load platform is mounted. The ends of the load cell structure are mounted to a support saddle and strap which are fixed to opposing base members of the base structure.

20 Claims, 7 Drawing Sheets

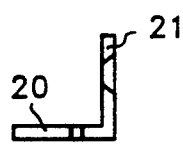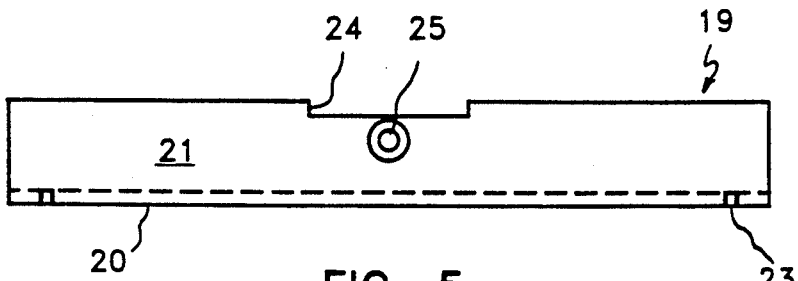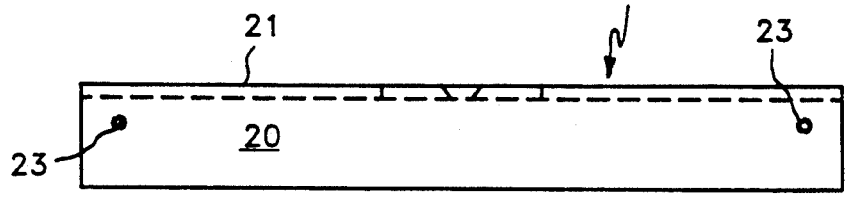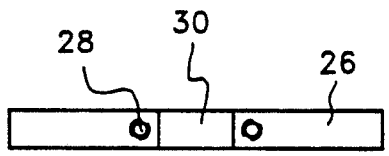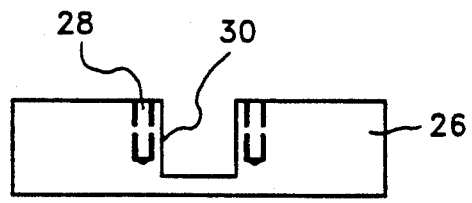
FIG. 7
FIG. 5
FIG. 6
FIG. 8
FIG. 9

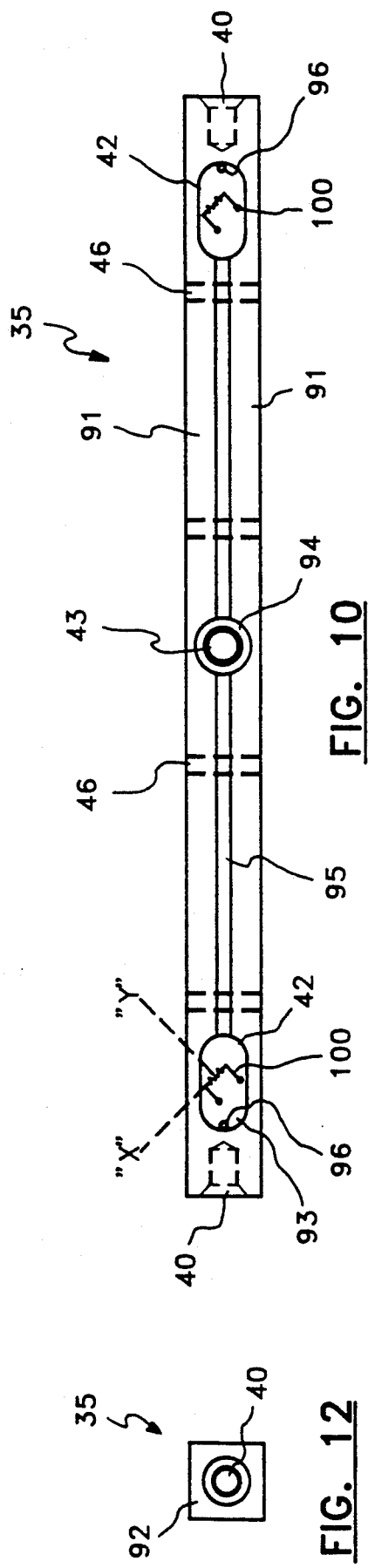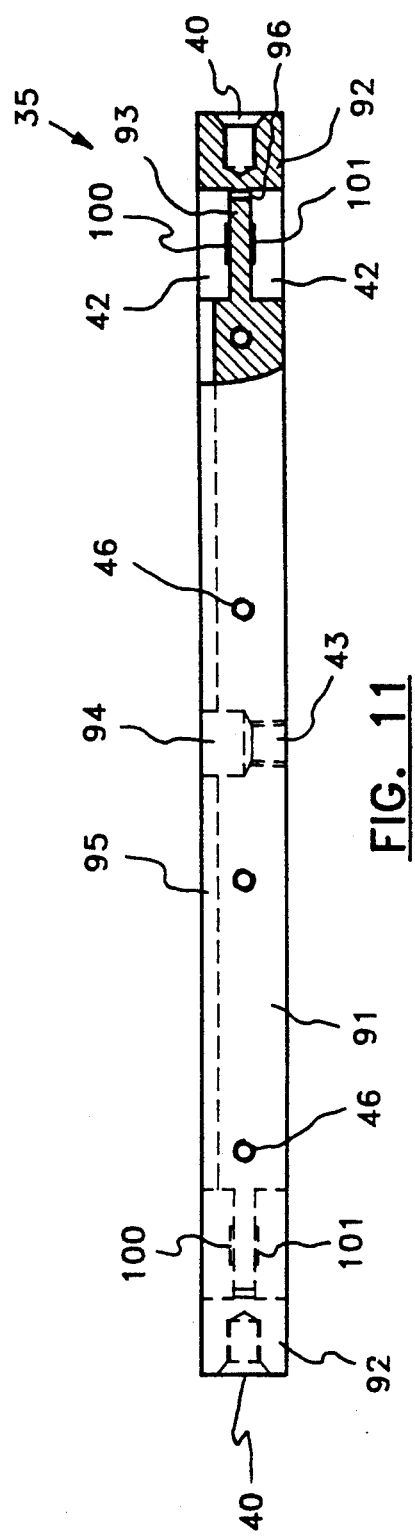

WEIGHING SCALE ASSEMBLY

BACKGROUND OF INVENTION

This invention relates generally to weighing scale assemblies and particularly to portable, low profile weighing scale assemblies.

Applicants, Kroll et al. have in the past disclosed wheel scale assemblies in U.S. Pat. Nos. 4,714,121 and 4,979,581 issued on Dec. 22, 1987 and Dec. 25, 1990, respectively. Applicants Kroll et al. have further disclosed load cell structures in U.S. Pat. Nos. 4,775,018 and 4,813,504 issued on Oct. 4, 1988 and Mar. 21, 1989, respectively. The latter load cell structures are shown used, respectively, in the wheel scale assemblies of the '121 and '581 U.S. Patents.

Applicants' above referenced wheel scale assemblies and associated load cell structures disclose low profile wheel scales designed for vehicles, such as trucks. Accordingly, the assemblies are designed and constructed to handle weights up to 20,000 lbs and yield weighing accuracies in the range of plus or minus one percent.

The weighing scale assemblies and load cell structures of the present invention are for weighing scale systems specifically designed for automobiles and particularly for racing cars. Accordingly, the scale assemblies are designed for lower weight capacities, i.e. 1000-1500 lbs. per weighing pad. Further, the accuracy of these weighing scales is plus or minus 0.5 percent.

Thus, it is the object of this invention to provide weighing scale assemblies and load cell structures for the race car industry and the like. The weighing scales are lightweight, low profile assemblies which are economical, easily manufactured and which yield reliable repeatable weighing results with a high degree of accuracy. And although the need for such accurate and repeatable, low cost weighing scales has long existed in the race car industry, none in so far as is known has been proposed or developed.

SUMMARY OF THE INVENTION

The present invention provides a portable, low profile weighing scale assembly which comprises a low profile base structure having opposing elongated L-shaped members of a predetermined length. Each L-shaped member has a vertical and a horizontal member and a central portion. A double ended shear beam load cell structure with pairs of opposing strain gauge members is mounted between the opposing central portions of the L-shaped base members. A planar load platform is mounted to the shear beam load cell and extends between the L-shaped base members.

The invention further provides means to mount the shear beam load cell to the opposing L-shaped base members, and means to mount the load platform to the central portion of the shear beam load cell.

The invention further provides for an interconnected assembly of individual wheel scales or pads which are connected by cables to a control unit to permit the simultaneous weighing and balancing of the sides and sectors of a racing car.

These and other benefits of this invention will become clear from the following description by reference to the drawings.

BRIEF DESCRIPTION OF THE DRAWINGS

FIG. 5 is a side view of a leg member of the scale;

FIG. 6 is a bottom view of the leg member shown in FIG. 5;

FIG. 7 is an end view of the leg member shown in FIGS. 5 and 6;

FIG. 8 is a top view of a support saddle of the scale;

FIG. 9 is a side view of the support saddle shown in FIG. 8;

FIG. 10 is a side view of a load cell of the scale;

FIG. 11 is a bottom View of the load cell shown in FIG. 10;

FIG. 12 is an end view of a load cell shown in FIGS. 10 and 11; and

DESCRIPTION OF THE PREFERRED EMBODIMENT

The weighing scale system 10 according to the present invention provides an economical, lightweight and self-contained system for weighing loads of approximately 4000-6000 lbs. (1800-2700 kg.), (utilizing a set of four individual weighing pads) with an accuracy of plus or minus one half (0.5) percent. However, the teachings of this invention are also applicable to scales having other weight capacities. The scale system 10 operates accurately on a variety of surfaces including asphalt, concrete, crushed stone, gravel, hard packed soil and soft ground. Further, the water resistant, moisture resistant, and dirt resistant wheel scale system 10 is usable under all environmental conditions and in a temperature range of approximately 32-122 degrees Fahrenheit (0-50 degrees Celsius).

Figure 1:
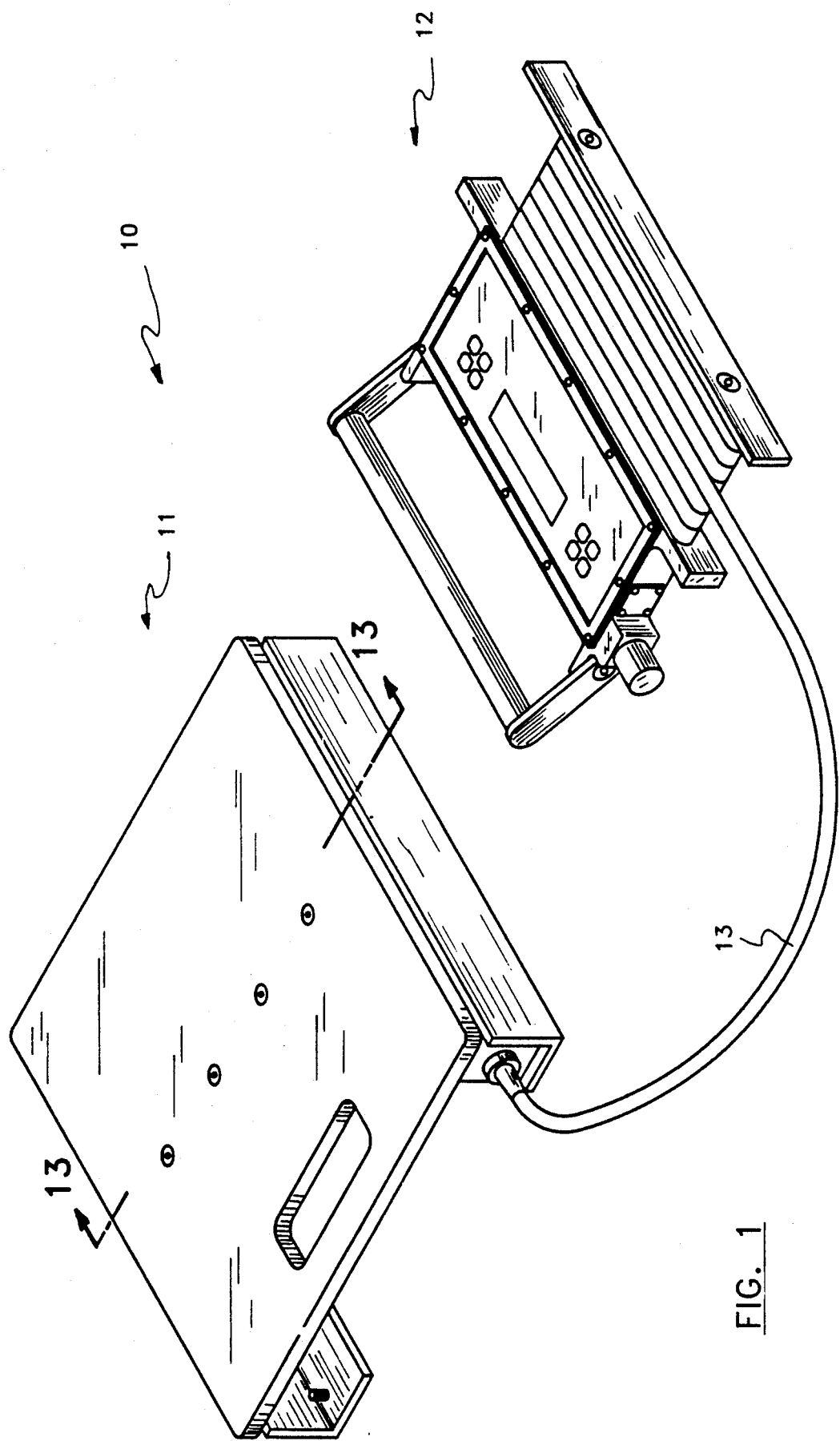
FIG. 1 is a perspective view of a weighing scale system of the present invention showing a single scale assembly.

Referring to FIG. 1, the scale system 10 of the present invention comprises at least one scale assembly or weigh pad unit 11 and an electronic control/indicator unit or module 12 which are communicatively connected to each other via a plurality of wire conductors or cables 13. In a preferred embodiment of the wheel scale system 10, four (4) scales or pads 11 are communicatively connected to the control unit 12. The scales 11 may be placed under the wheels of an automobile to enable the system 10 to measure the total weight of that automobile, for example, one used in the sport of automobile racing. The proportion of the total weight contributed by each weigh pad 11 may also be measured. Such information regarding the proportional weight associated at each quadrant or wheel of the automobile is useful in properly balancing the weight distribution of that automobile. It is also within the purview of this invention that one or any number of individual weigh pads 11 may be utilized for various weighing applications. Although in the instant example, the structure and function of the scale system 10 is discussed in the context of an automobile weighing and balancing application, the teachings of this invention are useable to produce an economical weighing scale for use in a variety of other fields. Also, utilizing various electronic circuitry and methods known in the art, additional information pertaining to the weighed subject matter may be detected, stored and analyzed.

In the instant example, the control and weigh pad units and 11 are low profile, compact and hand transportable. The system 10 is further designed so that the electronic cables 13 may be stored and transported with the control and weigh pad units 12 and 11 as a unitary system. Utilizing the teachings of this invention, weigh pads 11 are provided with a total weight each of approximately 17.7 pounds (8 kg.), and with exterior dimensions of approximately 15 inches (39 cm.) in length and width, and 3 inches (8 cm.) in height. The physical dimensions of the control unit 12 compliment those of the scale units 11 to provide an easily transportable system 10.

Figure 2:
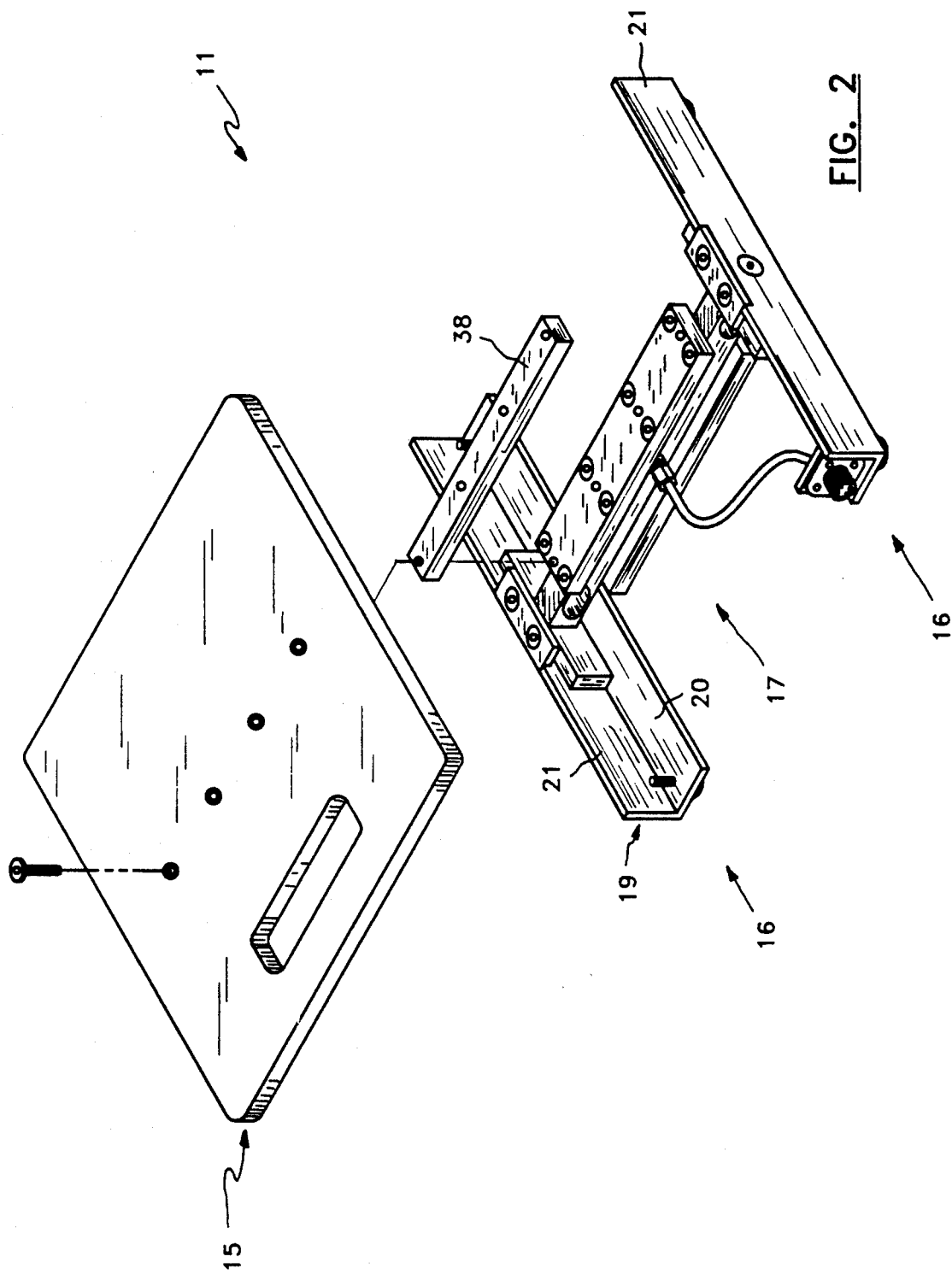
FIG. 2 is a perspective view, partially exploded for clarity, of the scale assembly or weigh pad shown in FIG. 1.
Figure 13:
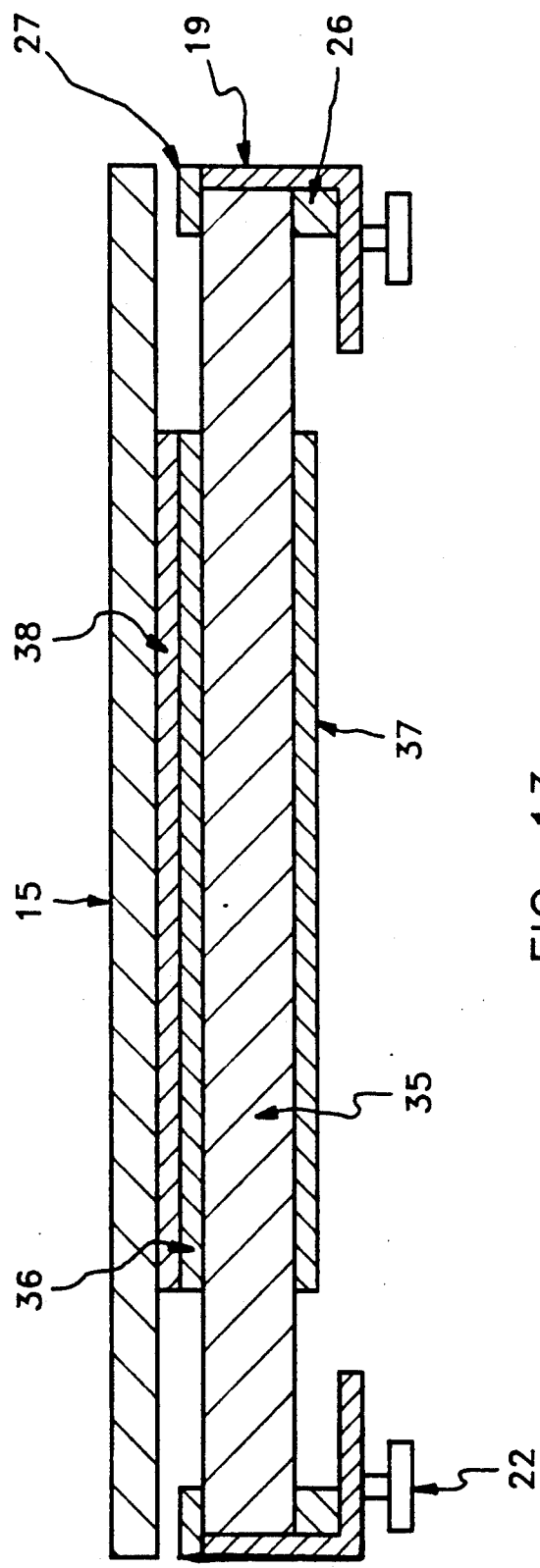
FIG. 13 is a cross-sectional view of the scale shown in FIG. 1 taken along line 13—13.

Referring to FIGS. 2 and 13, the weighing scale assembly 11 is shown to comprise, basically, a top load platform 15, a pair of bottom, spacially parallel legs or base members 16, and a load cell structure 17 which is mounted to and between the legs 16 and further to the platform 15. The generally square platform 15 has a top surface area which is sufficient to support the object to be weighed by the scale 11, for example, one wheel or tire of an automobile. The base members 16 are elongated and have a length generally equivalent to that of one side of the platform 15. In their operative configuration, the base members 16 are disposed below opposing peripheral edges of the platform 15. The vertical and horizontal dimensions of the base members 16 are selected to provide a stable, sturdy and low profile scale 11. The load cell structure 17 is the primary load bearing component of the scale 11. As shown, it is centrally located below the platform 15, and extends perpendicularly between the two leg members 16, at approximately their midpoints. The height or thickness of the load cell structure 17 is slightly less than that of the leg members 16. In the instant example, the automobile tire or load is preferably aligned, and centered along the apertures shown on the platform 15 so as to be correspondingly oriented in line with the load cell structure 17.

Figure 3:
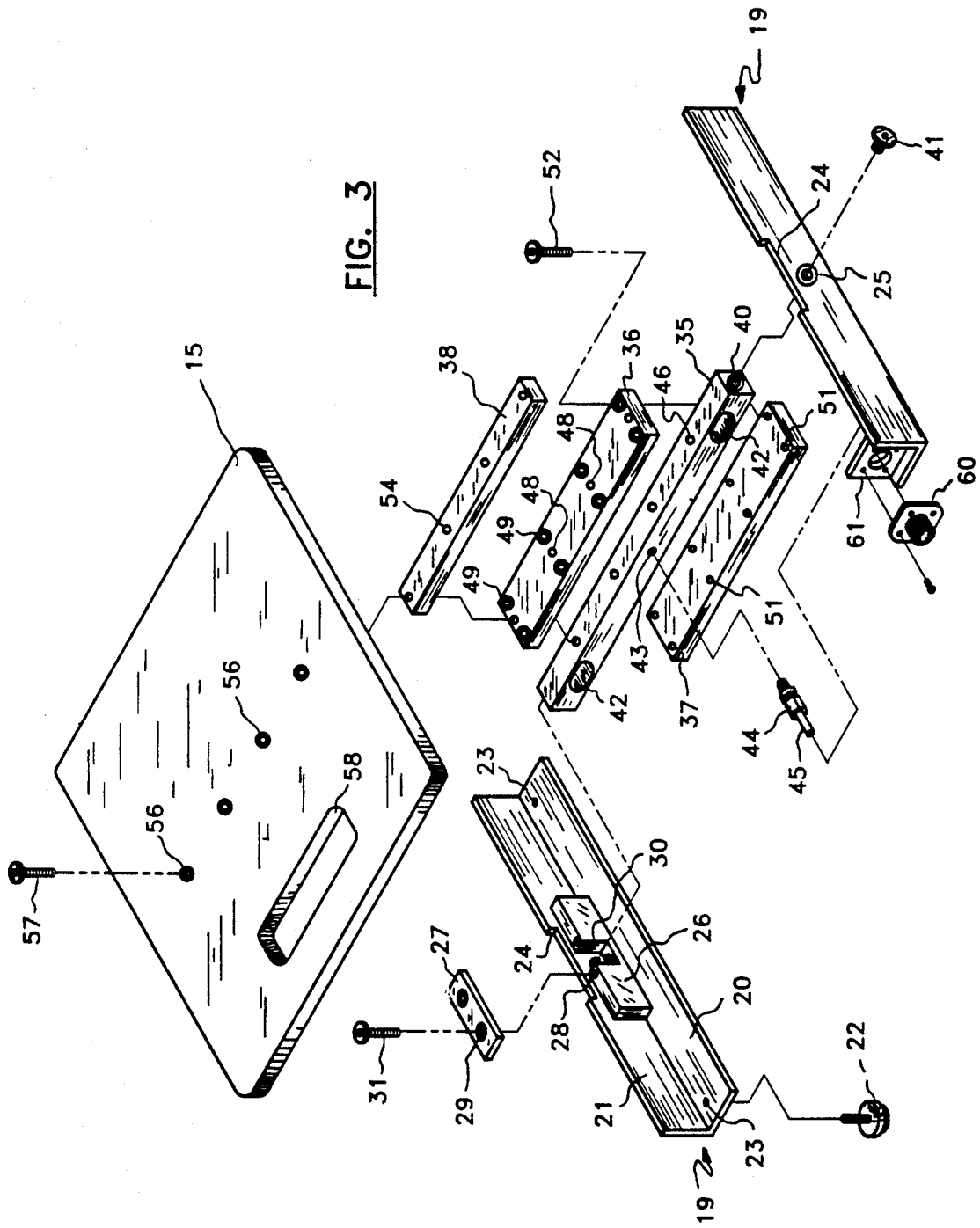
FIG. 3 is a fully exploded view, in perspective, of the scale shown in FIG. 2.

Referring to FIGS. 2 and 3, the base or leg members 16 comprise a leg angle 19, a support saddle 26, and a support strap 27. As is shown also in FIGS. 5-7, the leg angle 19 is a unitary, L-shaped structure with both horizontal and vertical members 20 and 21. The leg angle 19 is preferably composed of 0.25 high strength aluminum alloy such as 6061 T6 aluminum, for example. This material is preferably extruded, although a rolled construction may also be utilized. The leg angle 16 is shown to have an adjustable foot 22 disposed proximate each of its ends. Threaded apertures 23 are provided to vary the extension height of the feet 22. A strap notch 24 is generally centrally disposed at the top edge of the leg angle vertical member 21. Further, a load cell connection aperture 25 is shown disposed in the leg angle vertical member 21, aligned with the strap notch 24.

Referring also to FIGS. 8 and 9, each support saddle 26 is disposed on the top surface of a leg angle horizontal member 20, at its midpoint. The support saddle 26 is also shown to abut the inside surface of leg angle vertical member 21. The support saddle 26 is preferably welded to both the vertical and horizontal members 21 and 20 of the leg angles 19. The support saddle 26 is slightly elongated to distribute the load force transferred from the load cell 35 ends over a wider area of the leg angles 19. The support saddle 26 has a saddle notch 30 which is aligned with the load cell structure 17. The dimensions of the saddle notch 30 are slightly less than the cross-sectional dimensions of the load cell 35, so that in their operative orientation, the load cell 35 ends 92 are frictionally engaged by the saddle notch 30 surfaces. Additionally, a vertical threaded aperture 28 is disposed on the top surface of the support saddle 26, on each side of the saddle notch 30. The support strap 27 is shown to have a pair of apertures 29 which are aligned with threaded apertures 28 in the support saddle 26 and accept cap screws 31 to secure the support strap 27 to the support saddle 26. The function of the support strap 27 is to retain the load cell structure 17 ends in the saddle notch 30 and to prevent them from twisting under a shifting load condition. In its operative orientation, the support strap 27 is shown to project into the strap notch 24. The support saddle 26 is preferably constructed of high strength aluminum alloy, while the support strap 27 is preferably constructed of steel for additional strength.

Referring to FIGS. 2 and 3, the load cell structures 17 comprise a load cell 35, a pair of braces 36 and 37, and a spacer plate 38. The load cell 35 is a double ended shear beam type load cell mechanism which utilizes strain gauges to measure the weight of a load applied to the load cell 35. The detailed structure and function of the load cell 35 is discussed below. The load cell 35 is shown to have a threaded aperture 40 axially located at each of its ends 92 which provides additional securement of the load cell 35 to the leg angle 19 via a cap screw 41. The load cell 35 further has a plurality of top threaded apertures 46 for connection with the top brace 36, the platform spacer 38 and the platform 15, via cap screws 57.

A threaded aperture 43 is disposed in the side of the load cell 35 to receive a compression fitting 44, which joins a cable 45. The cable 45 provides electrical communication between the load cell (as described below) and a male-type electrical connector 60 which is attached to a connection bracket 61 on one end of a leg angle 19. The connector 60 provides electrical communication between the weigh pad 11 and the control module 12 via cable 13.

The top and bottom braces 36 and 37 are relatively thin, generally rectangular structures which are located immediately above and below the load cell 35. The length of each brace 36 and 37 is slightly less than the distance between the recesses 42 of the load cell 35 and the width is slightly greater than that of the load cell 35 such that an overhang region is formed. Each brace 36 and 37 has a plurality of apertures 49 and 51, respectively, located on the peripheral, overhang region which allow for connection of the two braces 36 and 37 via cap screws 52, as shown. The bottom brace apertures 51 are threaded to allow tightening of the cap screws 52. Apertures 48 are centrally located on the top brace 36, in a linear configuration, and are aligned in their operative orientation with apertures 46 of the load cell 35. The braces 36 and 37 are preferably constructed of 0.25 inch high strength aluminum alloy.

The spacer plate 38 is a relatively thin, elongated and generally rectangular member which is disposed on the top surface of top brace 36. The spacer 38 has a length which is equivalent to, and a width which is less than that of the top brace 36. A plurality of apertures 54 are centrally and linearly arranged on the spacer 38, and are aligned with apertures 48 of the top brace 36 in their operative orientation. The spacer 38 is also preferably constructed of 0.25 inch high strength aluminum alloy.

The platform 15 is shown to have a substantially square configuration with side lengths equivalent to the length and separation distance of the base numbers 16. The platform 15 preferably has an elongated aperture 58 which is utilized as a handle for operator carrying. A plurality of apertures 56 are generally centrally and linearly arranged on the platform 15, and are aligned with apertures 54, 48 and 46 as described above for connection with cap screws 57. The platform 15 is preferably constructed of 0.50 inch high strength aluminum alloy.

As shown in FIG. 13, the above referenced load cell structure 17 elements cooperate with the platform 15 and base members 16 to permit free vertical movement with resulting shear deformation of the elevated double ended beam structure of the load cell 35. Thus, as a force or load is placed on the platform 15, it is transferred to the load cell 35 via the spacer 38 and the top brace 36. In particular, the spacer 38 functions to concentrate the load applied over the relatively large surface area of the platform 15 to the longitudinal axis or center beam of the load cell 35. Thus, the width of the spacer 38 is preferably equivalent to that of the load cell 35. The length of the spacer 38 is equivalent to the predetermined center load area on the load cell 35, which is described below. The braces 36 and 37 function to stabilize the structure of the load cell 35. As will be described further below, the load cell 35 is subject to a transverse, vertical spreading force under a load condition. However, the top and bottom braces 36 and 37 provide a counter-acting and transverse compressive force, via cap screws 52 to stabilize the load cell and prevent vertical spreading. The compression provided by screws 52 on each side of the load cell 35 may be adjusted to vary and balance the compressive forces, and thereby increase the performance and accuracy of weighing. The horizontal dimensions of the braces 36 and 37 are selected to provide the above mentioned stabilization function and to transfer platform 15 load (via spacer 38) to the center load area of the load cell 35. It has been found that the utilization of the braces 36 and 37 yield, in effect, a larger load cell. Thus, the stabilization which results from the use of top and bottom braces 36 and 37 allows for the use of a single and smaller dimensional load cell 35.

Referring to FIGS. 10 and 12, the load cell 35 is elongated and has a substantially square cross-sectional configuration. Load cell ends 92 are positioned in the base members 16 and are connected thereat via cap screws 41 and support saddles 26, as explained above. Adjacent each end 92, gauging recesses 42 of a generally elongated circular configuration are located in opposing vertical side walls of the load cell 35 such that a longitudinally extending and vertically oriented stress isolation member 93 is formed between the opposing recesses 42. Four (4) strain gauges 100 and 101 are shown disposed in a predetermined orientation on the respective faces or surfaces of the stress isolation members 93. Each strain gauge 100 and 101 has a pair of conductors or wires (not shown) which extend for connection to the intra-scale cable 45 at the compression fitting 44. A wiring aperture 96 is disposed in each stress isolation member 93 to allow passage therethrough of the conductors of the strain gauges 101 located on one side of the load cell 35. A wiring slot 95 is generally centrally and longitudinally disposed in the opposing side of the load cell 35 to house the conductors of all the strain gauges 100 and 101 as they extend to a wiring bore 94 which is centrally disposed at the approximate midpoint of the load cell 35. The slot 95 depth is selected to fully enclose the strain gauge wiring and also to minimize reduction in structural integrity of the load cell body 35. To the extent that the load cell body 35 is unbalanced by the slot 95, the brace structure 36 and 37 described above is utilized to compensate for any loss and to stabilize the overall structure. The wiring bore 94 extends through the slot 95 side of the load cell 35 to merge with threaded aperture 43, and to thereby permit connection between the strain gauge conductors and the intra-scale cable 45. A water-proof sealant is preferably injected into the slot 95 and bore 94 to provide an environmental barrier. The load cell body is preferably constructed of an extruded high strength aluminum alloy such as 2024 T351 aluminum.

The strain gauges 100 and 101 measure dimensional changes within the load cell 35 caused by a load. The operation of the strain gauges 100 and 101 preferably used herein is based on the principle that the electrical resistance of a conductor changes when subjected to mechanical deformation due to weight being placed on the load cell 35. As the strain gauge 100 or 101 is stretched elastically, due to disfiguration of the stress isolation areas to which they are attached, its length and diameter are altered, resulting in a change in its electrical resistance. This resistance change is measured in accordance with Poisson's ratio to yield a weight value proportional to the load applied to the load cell 35.

Preferably, a bonded strain gauge is utilized, although wire, foil and semi-conductor type strain gauges may be used consistent with the teachings of this invention. As is known in the art, the bonded strain gauge consists of lead wires and active resistance wires which are mounted on a carrier sheet. For maximum performance, the active resistance wires are mounted, preferably via an insulating cement such as epoxy with an acrylic outer coating, very closely to the gauging surface of the stress isolation member 93 under no load conditions. The gauging recesses 42 may be sealed with polyurethane, for example, to provide a fully sealed load cell embodiment 35.

The strain gauges 100 and 101 are preferably oriented or gauged so that the load cell 35 yields accurate weighing irrespective of the exact location of the wheel or other load relative to the platform 15 top surface, for example, due to uneven load placement or scale 11 tilting. As shown, the strain gauges 100 on one side of the load cell 35 are located in a spacially parallel configuration, each at a forty five (45) degree angle with respect to the horizontal plane of the load cell 35. The strain gauges 101 on the opposite side of the load cell 35 are similarly positioned parallel to each other and at a forty five degree angle with respect to the horizontal plane of the load cell 35, but are further aligned so as to be spacially perpendicular to the orientation of strain gauges 100. In this configuration, the compressive and tensive forces are balanced; the uneven load effects being cancelled. Thus, accurate and reproducible electrical responses are achieved notwithstanding uneven load conditions.

All four strain gauges 100 and 101 are electrically connected to a circular connecting plate assembly (not shown) in the central wiring bore 94. As is known in the art, the gauges 100 and 101 are connected to a wheatstone bridge located on the plate for calibration of the load cell 35. The connecting plate assembly is connected to the interconnect wiring via the compression fitting 44 disposed in the aperture 94.

The size and spacial positioning of the stress isolation members 93 in the load cell body 35, including the specific separation distances between members 93 and the distance between each member 93 and the load cell ends 92 is a function of the strain gauge 100 and 101 orientation. As shown in FIG. 10, the horizontal "X" and vertical "Y" axis of the left strain gauge 100 are shown to intersect with vertical planes marking the longitudinal ends of the stress isolation member 93. A central load bearing area is formed in the load cell body 35 between the two stress isolation areas 93 and which is coextensive with the load concentrating lengths of the spacer 38 and top brace 36. Correspondingly, support of the load cell body 35 occurs outside each stress isolation area 93, within the load cell end regions 92. It has been found that this structural configuration in cooperation with the above-mentioned gauging compensation minimizes the deleterious effects of any twisting forces occurring in the central load bearing area.

Figure 4:
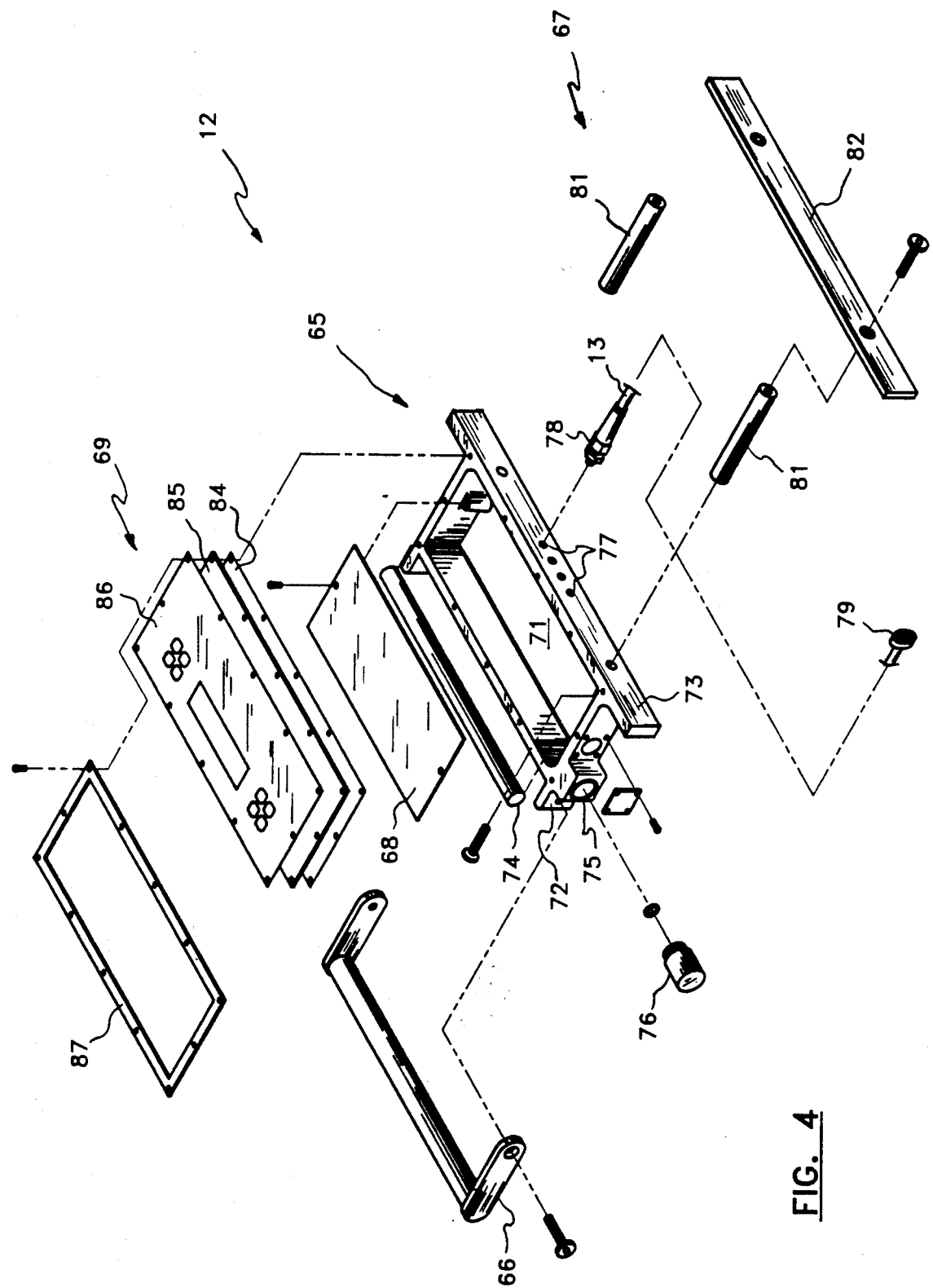
FIG. 4 is an exploded view, in perspective, of the control unit shown in FIG. 1.

Referring to FIG. 4, the control unit or module 12 comprises a keypad housing 65 which is preferably composed of cast aluminum materials to provide EMI/RMI immunity for its internal circuitry. The keypad housing 65 has an open cavity 71 at its top and houses the electronic components and power source of the system. The electronic components of the system 12 are preferably disposed on a printed circuit board 68 for spacial economy, durability, and ease of manufacture and repair. The circuit board 68 is mounted within the keypad housing 65 on shock absorbing mounting elements. The circuit board assembly 65 is connected to the load cell structure 17 via interconnect wiring in cable 13, which are shown to enter apertures 77 via compression fittings 78. The cables 13 terminate in female connectors 79 which mate with connectors 60 of each scale 11. The control unit 12 is shown to have a cable holder 67, including extension bars 81 and a strap 82 for holding the cables 13 in a wrapped configuration for ease of transport and storage.

Fixed to the control system 12 is a handle structure 66. The handle structure 66 is preferably angled upward to allow full hand access for lifting of the control unit 12 without contacting the ground.

The circuit board 68 preferably includes amplifier means, filter means, an analog to digital converter, a microprocessor, memory and a liquid crystal diode (LCD) or similar display. The microprocessor provides control features such as automatic test; low power indication; error alerting; automatic power down after a predetermined time period; auto-zero tracking; percentage weight calculation; and manual calibration adjustment. The printed circuit board 68 may be coated with a sealant which protects it from moisture and fungus, but which also allows repairs to be made to the circuit board components. The circuit board 68 is also insulated from the remaining elements of the wheel scale system 10 to prevent accidental shock while in use.

The electronic components are powered by a battery pack 74 which consists, for example, of six "AA" 1.2 volt rechargeable Ni-Cd or Alkaline batteries. The batteries are preferably connected together in series and secured by a plastic heat shrink tubing. Such a battery pack 74 configuration provides easy removal and replacement of batteries without the use of tools, and also prevents battery corrosion from contaminating the remaining electrical components. A connector cap 76 and sealing O-ring prevent entry of dirt and moisture, and maintain the battery pack 74 in a constant position for weighing operation. This configuration further provides shielding from electrical interference during charging, such as starting of the vehicle, radio transmission, or other electrical accessories. The battery pack 74 is insertable into the housing 65 at a threaded battery port 75.

The control module 12 further has a cover 69 including a protective face plate or bezel 87, a key pad 86 which has a number of control switches, a key pad support 85, and a bezel gasket 84 which are sealably connected to the top edge of the housing 65. The keypad switches are preferably of a pressure sensitive waterproof membrane type.

In use, the control unit 12 provides a number of predetermined weighing and self test functions. An "on" switch, when activated, causes the system to test all of the segments on the display and then to zero itself. A separate "off" switch is provided for unambiguous operation by the operator. A "test-zero" switch tests the display function by activating all of its segments and re-zeros the system. Subsequent to placing a vehicle load on the scales 11, the display indicates the total weight of the vehicle as well as the individual weight being applied to each scale 11. A "% -wgt" switch may be activated to indicate the percentage of the total weight which is being applied to each scale 11. Individual switches "LF", "RF", "LF" and "RR" may be activated to deactivate or activate any scale 11, and hence input to the above reference totals.

The above scale units 11 have been shown and described to have a single load cell 35 which cooperates with the L-shaped base members 16, support saddle 26, strap 27 and top and bottom braces 36, 37 to provide the structural or weight bearing members for the platform 15 and loads placed thereon. This cooperative arrangement provides an economical, lightweight and accurate weighing scale for the weighing purposes described. It is also within the purview of this invention to provide a scale unit which may utilize a plurality of load cells 35. Although the latter scale unit would be more costly and heavier in construction, its weighing accuracy and repeatability would increase.

As many changes are possible to the embodiments of this invention utilizing the teachings thereof, the descriptions above, and the accompanying drawings should be interpreted in the illustrative and not the limited sense.

That which is claimed is:

1. A low profile weighing scale assembly comprising:
   (a) a low profile base structure having opposing elongated support members of a predetermined length and each having a central portion;
   (b) a double ended shear beam load cell structure having opposing strain gauge means mounted at each end thereof;
   (c) a pair of saddle base members each having a notch therein and a pair of saddle strap members, said saddle base members being mounted to said central portions of said support members, said load cell structure ends being placed in said saddle base member notches, said saddle strap members being fixed to said saddle base members over said placed load cell structure ends, and said shear beam load cell ends being fixed to each said support member;

(d) a planar load platform extending between said opposing support members; and (e) means to mount said load platform to said shear beam load cell structure.

2. The low profile weighing scale assembly of claim 1, wherein said load platform mounting means includes top and bottom brace members for attachment to the central portion of said shear beam load cell between said opposing strain gauge means, said platform mounting means further including a spacer plate mounted to said top brace member and to said load platform.

3. The low profile wheel scale assembly of claim 2, wherein said load platform, said spacer plate, said top brace and said load cell structure have aligned apertures, and wherein screws are provided for securing said platform to said load platform through said apertures.

4. The low profile wheel scale assembly of claim 2, wherein said top and bottom brace members have a width greater than said beam load cell structure and wherein said top and bottom brace members have securement means along the periphery to secure said load cell therebetween.

5. The low profile wheel scale assembly of claim 1, wherein said load platform has a slotted aperture for providing a handle member for said scale assembly.

6. The low profile wheel scale assembly of claim 1, wherein electronic connector means are provided at the end of one said support members for connection to read out means.

7. The low profile wheel scale assembly of claim 6, wherein a control module is provided for connection to said electronic connector.

8. The low profile wheel scale assembly of claim 6, wherein four such assemblies are interconnected for measuring the weight of four wheels of a car, said assembly further including a control unit having electronic input connector means and cable means for interconnecting each said scale assembly to said input connector means of said control unit.

9. The low profile wheel scale assembly of claim 8 wherein said control unit further includes a display and key pad assembly, an electronic memory, a self diagnostic system, calibration means, a rechargeable power supply, automatic turn-off means, a low power indicator and a light means for said display.

10. The low profile wheel scale assembly of claim 9, wherein said control unit further includes means to read weight in english and metric systems, an AC connecting means, an internal rechargeable battery system, a protective carrying case for said control unit, RFI/EMI protection circuitry, printing means and ramps for each said weighing scale assembly.

11. The low profile wheel scale assembly of claim 1, wherein adjustable feet members are provided at each end of said opposing support members.

12. The low profile wheel scale assembly of claim 1, wherein said support members and said load platform are constructed of an aluminum alloy.

13. A low profile weighing scale assembly comprising:

(a) a low profile base structure comprising opposing linear plate members, each having a predetermined length and a central portion;

(b) a double ended shear beam load cell assembly for mounting to and between said central portions of said opposing linear plate members;

(c) mounting means for attaching the ends of said shear beam load cell assembly to said central portions of said opposing linear plate members;

(d) a planar load platform extending between said opposing linear plate members; and (e) a spacer plate structure, a top brace member and a bottom brace member, said spacer plate and said top brace member being mounted to the top central portion of said load cell assembly and to said load platform and said bottom brace member being mounted to the bottom central portion of said load cell assembly, for mounting said load platform to said shear beam load cell assembly.

14. The weighing scale assembly of claim 13, wherein said opposing plate members are comprised of L-shaped metallic members.

15. The weighing scale assembly of claim 13, wherein said shear beam mounting means includes a support saddle structure fixed to said central portion of each said linear plate member.

16. The weighing scale assembly of claim 15, wherein said support saddle structure further includes a support saddle member and a support strap member.

17. The weighing scale assembly of claim 13, wherein said base structure, shear beam assembly and load platform are constructed of an aluminum alloy.

18. The weighing scale assembly of claim 13, wherein said double ended shear beam load cell assembly has a rectilinear cross-sectional configuration.

19. The weighing scale assembly of claim 13, wherein a pair of adjustable feet structures are mounted to the bottom of each said linear plate member.

20. A low profile weighing scale assembly comprising:

(a) a low profile base structure having opposing elongated support members of a predetermined length and each having a central portion;

(b) a single double ended shear beam load cell structure having opposing strain gauge means mounted proximate each end thereof and forming a central load bearing region thereinbetween;

(c) clamp means to rigidly and fixedly mount said load cell structure ends, outside said load bearing region, to said central portions of said opposing support members, said clamp means including a pair of base members centrally disposed on said support members and having a notch for placement of said load cell structure ends, and a strap member disposed over each said base member notch;

(d) a planar load platform extending between said opposing support members; and (e) means to mount said load platform to said load cell structure, inside said load bearing region.

* * * * *